Aug. 6, 1940.  W. C. HARP  2,210,289
AUTOMOBILE RADIO ANTENNA
Filed Nov. 3, 1937

Wilbur C. Harp
INVENTOR.

BY *Elwin A. Andrus*
ATTORNEY.

Patented Aug. 6, 1940

2,210,289

UNITED STATES PATENT OFFICE 2,210,289

AUTOMOBILE RADIO ANTENNA

Wilbur C. Harp, Milwaukee, Wis., assignor to A. O. Smith Corporation, Milwaukee, Wis., a corporation of New York Application November 3, 1937, Serial No. 172,527

3 Claims. (Cl. 250—33)

This invention relates to an automobile radio antenna and more particularly to a combined radiator grille and radio antenna.

The main object of the invention is to provide a more efficient radio antenna for automobiles.

Other objects will appear hereinafter in connection with the description of the preferred embodiment of the invention illustrated in the accompanying drawing.

In accordance with the invention the grille 1 which is located in front of the radiator 2 of the automobile is constructed of rubber or other suitable insulating material such as a resinous product.

Figure 1:
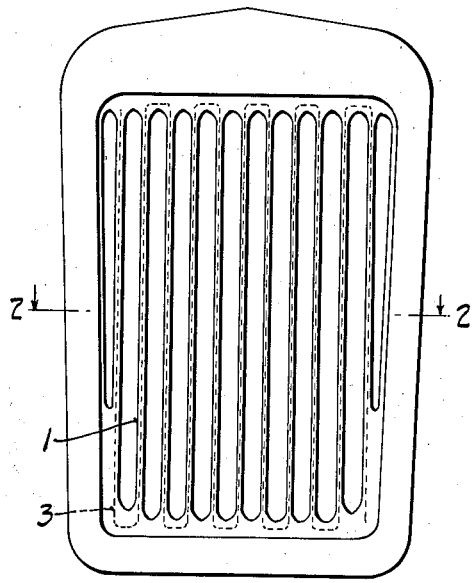
Figure 1 is a front elevation of a grille.
Figure 3:
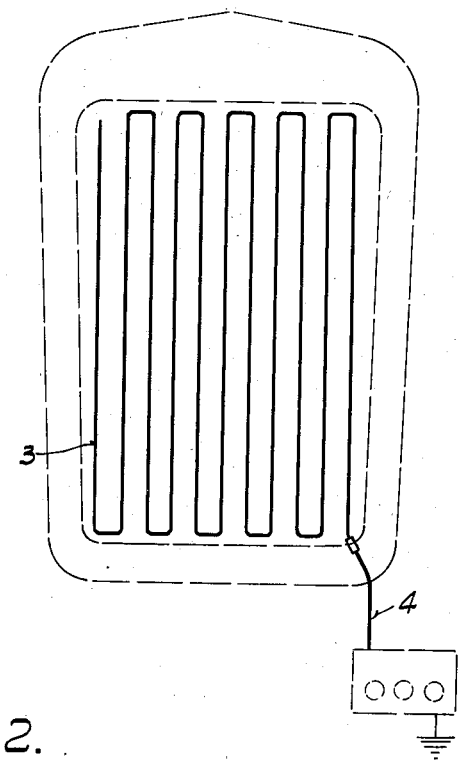
Fig. 3 is a diagrammatic illustration of the antenna.
Figure 2:
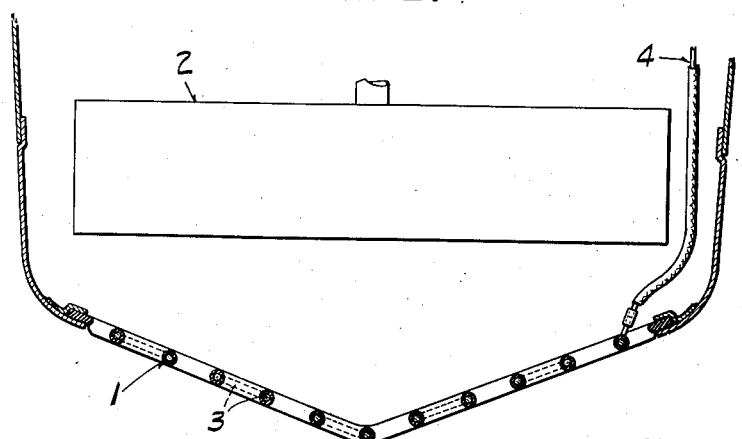
Fig. 2 is a transverse section taken on line 2—2 of Fig. 1.

The antenna or aerial wire 3 is embedded in the rubber grille 1 and extends back and forth along parallel strips of the grille as illustrated in Fig. 3. The antenna is connected to the radio in the automobile by a suitable shielded lead 4.

By mounting the antenna in the grille, it is not only protected from the engine and ignition by the natural shield provided by the radiator, but it is completely insulated from contact with the metal of the automobile. Furthermore by embedding the aerial wire in the grille or by attaching it to the surface of the grille it serves as a stiffener for the grille and tends to prevent distortion of the grille.

The invention may have various embodiments within the scope of the accompanying claims.

I claim:

1. In combination in an automobile, a radiator located at the forward end of the automobile, a grille through which air passes to said radiator, said grille comprising a frame and a series of substantially parallel cross members all composed of a non-metallic rubber-like material, a wire embedded in said grille and extending back and forth through said cross members to provide a radio antenna and to reinforce said grille, and means for connecting one end of said wire to the aerial terminal of a radio in the automobile, said wire being insulated from the metal parts of the automobile by means of said grille.

2. A grille for an automobile, comprising a rubber frame having a plurality of substantially parallel spaced cross members and adapted to be disposed in the body of the automobile for the passage of air therethrough, a reinforcing wire embedded in said rubber and extending continuously back and forth through said cross members to provide a radio antenna of substantial length, the rubber serving to insulate the antenna from the body of the automobile, and means for connecting the wire to a radio in the automobile.

3. In combination in an automobile, a rubber grille having a frame and a plurality of substantially parallel cross members, a reinforcing wire secured to said grille and extending continuously back and forth along said cross members to provide a radio antenna of substantial length, the rubber frame of the grille serving to insulate the antenna from the body of the automobile, and means for connecting one end of the wire to a radio in the automobile.

WILBUR C. HARP.